(12) United States Patent
Takatori et al.

(10) Patent No.: US 6,245,258 B1
(45) Date of Patent: *Jun. 12, 2001

(54) SMECTIC LIQUID CRYSTAL MATERIAL AND LIQUID CRYSTAL OPTICAL ELEMENT

(75) Inventors: Ken-Ichi Takatori; Ken Sumiyoshi; Yoriko Hatada; Jin Matsushima, all of Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/058,773

(22) Filed: Apr. 13, 1998

(30) Foreign Application Priority Data

Apr. 11, 1997 (JP) .................................... 9-093853
Mar. 26, 1998 (JP) .................................... 10-079473

(51) Int. Cl.$^7$ ........................... C09K 19/12; C09K 19/20
(52) U.S. Cl. ............................. 252/299.65; 252/299.66; 252/299.67
(58) Field of Search ................. 252/299.61, 299.66, 252/299.65, 299.67

(56) References Cited

U.S. PATENT DOCUMENTS

| 4,856,875 | * | 8/1989 | Kozaki et al. | 349/182 X |
| 4,895,671 | * | 1/1990 | Ushioda et al. | 252/299.61 |
| 5,106,531 | * | 4/1992 | Murashiro et al. | 252/299.61 |
| 5,378,392 | * | 1/1995 | Murashiro et al. | 252/299.01 |
| 5,534,190 | * | 7/1996 | Johno et al. | 252/299.65 |
| 5,667,722 | * | 9/1997 | Iwaya et al. | 252/299.61 |
| 5,779,934 | * | 7/1998 | Higashi et al. | 252/299.61 |
| 5,840,209 | * | 11/1998 | Mineta et al. | 252/299.67 |
| 5,861,109 | * | 1/1999 | Goodby et al. | 252/299.65 |

FOREIGN PATENT DOCUMENTS

| 3-223390 | 2/1991 | (JP) . |
| 5-271658 | 10/1993 | (JP) . |
| 6-25153 | 2/1994 | (JP) . |
| 7-11253 | 1/1995 | (JP) . |
| 8-113785 | 5/1996 | (JP) . |
| 8-325237 | 12/1996 | (JP) . |
| 10-088139 | 4/1998 | (JP) . |
| 10-96965 | 4/1998 | (JP) . |
| 10-176168 | 6/1998 | (JP) . |

OTHER PUBLICATIONS

Noel A. Clark et al., "Submicrosecond bistable electro–optic switching in liquid crystals", *Appl. Phys. Lett.*, vol. 36, No. 11, Jun. 1, 1980, pp. 899–901.

A.D.L. Chandani et al., "Antiferroelectric chiral Smectic Phases Responsible for the Tristable Switching in MHPOBC", *Japanese Journal of Applied Physics*, vol. 28, No. 7, Jul., 1989, pp. L1265–L1268.

Y. Yamada et al., "Ferroelectric Liquid Crystal Display Using Tristable Switching", *Japanese Journal of Applied Physics*, vol. 29, No. 9, Sep., 1990, pp. 1757–1764.

Shiroh Inui et al., "Thresholdless Antiferroelectricity in Liquid Crystals", *The 21st Liquid Crystal Debate Lecture Textbook 2C04*, 1995, pp. 222 and 250.

T. Saishu et al., "Voltage–Holding Properties of Thresholdless Antiferroelectric Liquid Crystals Driven by Active Matrices", *SID 96 Digest*, 1996, pp. 703–706.

* cited by examiner

*Primary Examiner*—C. H. Kelly
(74) *Attorney, Agent, or Firm*—Sughrue, Mion, Zinn, Macpeak & Seas, PLLC

(57) ABSTRACT

A smectic liquid crystal material which comprises (1) an antiferroelectric liquid crystal material and/or a liquid crystal material ferroelectric phase and (2) a liquid crystal material having a smectic C phase. The smectic liquid crystal material may be used in a liquid crystal optical element having a spontaneous polarization of 0.06 nC/cm$^2$ to 96 nC/cm$^2$. The smectic material has a low spontaneous polarization value and the curve of light transmittance to applied voltage for the smectic material has a V-shaped characteristic.

13 Claims, 9 Drawing Sheets

SMECTIC LIQUID CRYSTAL MATERIAL AND LIQUID CRYSTAL OPTICAL ELEMENT

BACKGROUND OF THE INVENTION (i) Field of the Invention

The present invention relates to a liquid crystal optical element utilizable in a display for displaying characters, figures and the like, a dimmer in which the transmission quantity of an incident light changes, an optical shutter and the like. More specifically, it relates to a liquid crystal optical element in which a smectic liquid crystal material is used.

(ii) Description of the Related Art

As a liquid crystal display in which a wide viewing angle and a rapid response can be expected, there has been suggested a display element using an optical switching phenomenon of a ferroelectric liquid crystal material by N. A. Clark and S. T. Lagerwall (App. Phys. Lett., Vol. 36, p. 899 (1980) (hereinafter referred to as "Reference 1"). A surface-stabilized ferroelectric liquid crystal (SSFLC) optical element is characterized in that an optical response is rapid (1 msec or less) and a viewing angle is wide. However, the SSFLC is bistability, and the electro-optical response of the SSFLC optical element is limited to the switching of two states of a light state and a dark state. Therefore, the SSFLC has a problem that it is difficult to display a half tone by the control of a voltage. Furthermore, it also has a problem that the liquid crystal layer is liable to form a chevron structure, so that a contrast is low and a layer structure is easily disturbed by a mechanical impact, and what is worse, the recovery of a once disturbed orientation is difficult.

As another optical element, a liquid crystal material having an antiferroelectric phase (an antiferroelectric liquid crystal material) has been reported by Chandani et al. (Jpn. J. Appl. Phys., Vol. 28, L1265 (1989); hereinafter referred to as "Reference 2"), and a display element utilizing the antiferroelectric liquid crystal material has also been suggested (Jpn. J. Appl. Phys., Vol. 29, p. 1757 (1990); hereinafter referred to as "Reference 3"). The antiferroelectric liquid crystal material has tristability based on a phase change between an antiferroelectric phase and a ferroelectric phase, and by the utilization of a mechanism of switching them under the application of a bias voltage, a display device which permits the display of the half tone can be manufactured. However, in the display element in which the bias voltage is necessary for the display of the half tone and a high precision and many scanning lines are required, there is a problem that a drive waveform is complex.

On the other hand, a smectic liquid crystal material (hereinafter referred to as "the thresholdless smectic liquid crystal material") in which a curve showing a relation of a light transmittance to an applied voltage has a V-shaped form (V-shaped characteristics) has been reported by Inui et al. and Tanaka et al. (The 21st Liquid Crystal Debate Lecture Textbook 2C04, p. 222 (1995) and p. 250 (1995); hereinafter referred to as "Reference 4"). It is described therein that the thresholdless smectic liquid crystal optical element using this material does not possess any definite threshold for a phase change and has low hysteresis characteristics.

Furthermore, a liquid crystal material having a diagonal line of 5 inches which comprises a combination of this thresholdless smectic liquid crystal optical element and a thin film transistor (TFT) has been reported by T. Saishu et al. [SID'96 Digest, p. 703 (1996); hereinafter referred to as "Reference 5"]. In this report, there is first used, as a test cell, a cell having a cell gap of 2 $\mu$m and an electrode area of 1 cm$^2$ into which a thresholdless smectic liquid crystal material TLAF-1 made by Mitsui Petrochemical Industries, Ltd. is poured. It is described that when an auxiliary capacity (a storage capacity) is increased and a temperature is raised by this cell, the voltage holding properties of the liquid crystal can be improved. However, in the liquid crystal element having a diagonal line of 5 inches which is combined with an actually manufactured thin film transistor, a contrivance for the increase of the auxiliary capacity and the like obtained in the test cell is not carried out. Therefore, in an AC type drive in which writing is done at both of positive and negative polarities, a contrast ratio is less than 10, and hence it cannot be sufficiently secured. In consequence, a DC type drive in which the writing is done with one polarity is employed. By this technique, the liquid crystal optical element having 234 scanning lines and a diagonal line of 5 inches is subjected to an NTSC drive (a writing time at a gate is 63.5 $\mu$s), thereby obtaining a contrast ratio of 10 or more.

As described above, it is possible to drive the thresholdless smectic liquid crystal optical element by an active element such as the TFT. However, the above-mentioned thresholdless smectic liquid crystal material has a large spontaneous polarization value of 100 nC/cm$^2$ or more, and in order-to drive the thresholdless smectic liquid crystal material having such a large spontaneous polarization, it is necessary to pour an electric charge in proportion to the spontaneous polarization. However, since a charge quantity which can be fed from the TFT is limited, there is a problem that the number of the scanning lines of the drivable liquid crystal optical element is decreased. In fact, in Reference 5, the number of the scanning lines is 234, which is less than the half of a usual VGA type. Furthermore, as shown in Reference 5, some problems are present. For example, in order to obtain the sufficient contrast ratio, a sufficient writing charge quantity is necessary, and in order to secure the charge quantity, there is employed the DC drive in which the writing is done under a unipolar voltage instead of a bipolar voltage (an AC type), so that burning takes place. Additionally, even in the case of the DC drive, in a writing time in one frame, the writing charge quantity is insufficient, and in order to secure the sufficient charge, the charge pouring of several frames is necessary, so that a response time of the liquid crystal optical element is prolonged inconveniently.

As one of means for solving these problems, there is a technique of adding a large auxiliary capacity to the TFT as shown in Reference 5, but if the auxiliary capacity is increased, an aperture efficiency ratio of the liquid crystal optical-element deteriorates, so that the display is in a dark state. Furthermore, according to the investigation of the inventors, the increase of the auxiliary capacity leads the increase of an RC constant, and in order to perform the sufficient writing within a predetermined writing time, it has been understood that lowering an ON-state resistance R of the TFT and improving TFT characteristics are necessary. That is to say, if an ON-state current of the TFT cannot be sufficiently obtained, the writing is not completed within the writing time, because of the increased capacity value. Therefore, when the TFT characteristics are decided and when the spontaneous polarization value of the liquid crystal material and a panel structure are decided, an optimum limit value of the auxiliary capacity is present, and the auxiliary capacity larger than the limit value increases the RC constant and decreases the poured charge quantity within the writing time, with the result that the writing charge quantity to the liquid crystal is reduced.

The drive of the liquid crystal material having the large spontaneous polarization can be accomplished by using the TFT having the sufficient characteristics or by doing the writing at a high voltage. In this case, however, the following problems exist. In the first place, the development of the new TFT having the sufficient characteristics is necessary. Next, it is necessary to develop a drive circuit which can apply a high drive voltage. Even if these two intentions are realized, it is required that a large amount of the charge is allowed to flow in order to drive the liquid crystal material having the high spontaneous polarization, so that an extremely large power is inconveniently consumed.

On the other hand, it can easily be presumed that if the spontaneous polarization of the thresholdless smectic liquid crystal material is decreased, the above-mentioned problems can be solved. However, there have not been reported a smectic liquid crystal material having electro-optical characteristics that a curve showing a relation of a light transmittance to an applied voltage has a V-shaped form, and having the low spontaneous polarization.

SUMMARY OF THE INVENTION

The present inventors have intensively researched to solve the above-mentioned problems, and as a result, it has been found that a smectic liquid crystal material having V-shaped characteristics and a low spontaneous polarization can be prepared by mixing an antiferroelectric liquid crystal material and a liquid crystal material having a smectic C phase.

That is to say, the aspects of the present invention are as follows.

1. A smectic liquid crystal material which comprises an antiferroelectric liquid crystal material and a liquid crystal material having a smectic C phase.

2. A smectic liquid crystal material which comprises a liquid crystal material having a ferrielectric phase and a liquid crystal material having a smectic C phase.

3. The smectic liquid crystal material according to the above-mentioned paragraph 1 or 2 wherein the concentration of the liquid crystal material having the smectic C phase is 30% by weight or more.

4. The smectic liquid crystal material according to any one of the above-mentioned paragraphs 1, 2 and 3 wherein the phase sequence of the liquid crystal material having the smectic C phase is crystal phase-smectic phase C-nematic phase-isotropic phase.

5. The smectic liquid crystal material according to any one of the above-mentioned paragraphs 1, 2, 3 and 4 wherein the liquid crystal material having the smectic C phase comprises an optically active phenylpyrimidine compound represented by the general formula I

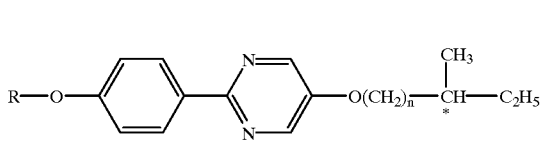

wherein R is an alkyl group having 1 to 18 carbon atoms; n is an integer of 2 to 15; and C attached with * is an asymmetric carbon.

6. The smectic liquid crystal material according to any one of the above-mentioned paragraphs 1 to 5 which further contains a liquid crystal material having a smectic A phase and which possesses the smectic A phase in the phase sequence.

7. The smectic liquid crystal material according to any one of the above-mentioned paragraphs 1 to 6 wherein the spontaneous polarization is in the range of 0.06 nC/cm² to 96 nC/cm².

8. The smectic liquid crystal material according to the above-mentioned paragraph 7 wherein the spontaneous polarization is in the range of 1.9 nC/cm² to 21 nC/cm².

9. A liquid crystal optical element in which a liquid crystal layer comprising a liquid crystal material described in any one of the above-mentioned paragraphs 1 to 8 is interposed between two substrates provided with electrode layers, at least one of the substrates being transparent.

10. The liquid crystal optical element according to the above-mentioned paragraph 9 wherein an optical axis of the liquid crystal layer continuously changes to an applied voltage.

11. The liquid crystal optical element according to the above-mentioned paragraph 9 or 10 wherein an active element is disposed on the substrate.

Figure 1A:
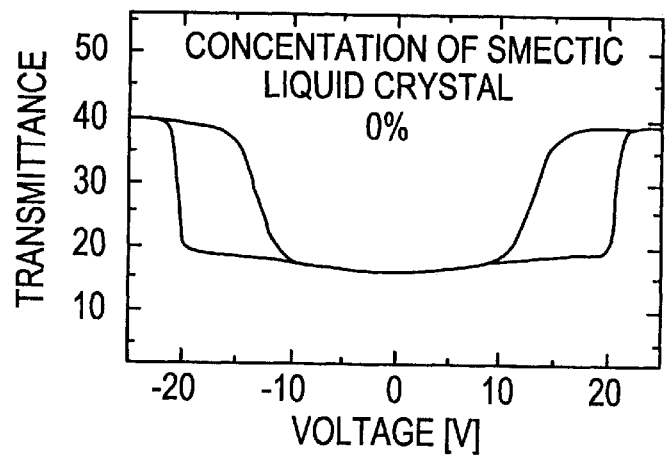
FIGS. 1 and 2 show a relation between a composition and electro-optical characteristics of a liquid crystal material of the present invention.

Explanation of Symbols
1: Transparent substrate
2: Transparent electrode
3: alignment layer
4: Smectic liquid crystal material
5: Polarizer
6: Pixel electrode
7: Drain bus line
8: Gate bus line
9: TFT (thin film transistor)

DETAILED DESCRIPTION OF THE INVENTION

As an antiferroelectric liquid crystal material of the present invention, a liquid crystal material having an antiferroelectric phase in any of a phase sequence is acceptable. Examples of the antiferroelectric liquid crystal material include, but are not limited to, compounds represented by the formulae (1) to (5). Furthermore, the antiferroelectric liquid crystal materials may be used singly or as a mixture of two or more kinds thereof.

is an integer of 2 to 15; and C attached with * is an asymmetric carbon, and preferably R is an alkyl group having 4 to 11 carbon atoms; and n is an integer of 2 to 8.

(1)
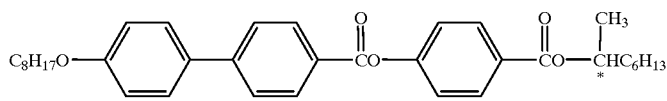

(2)
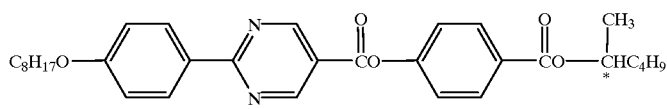

(3)
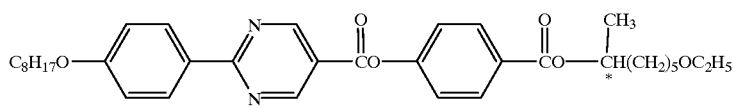

(4)
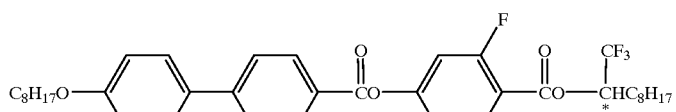

(5)
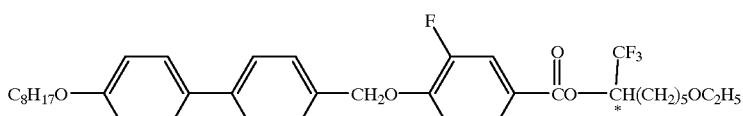

As a liquid crystal material having a smectic C phase which can be mixed with the antiferroelectric liquid crystal material of the present invention, a liquid crystal material having the smectic C phase in any of the phase sequence is acceptable. Examples of the liquid crystal material having the smectic C phase include, but are not limited to, compounds represented by the above-mentioned formula I, wherein R is an alkyl group having 1 to 18 carbon atoms; n Furthermore, additional examples of the liquid crystal material having the smectic C phase include, but are not limited to, compounds represented by the following formulae (6) to (9). These liquid crystal materials each having the smectic C phase may be used singly or as a mixture of two or more kinds thereof.

(6)
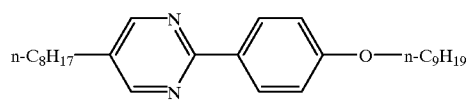

(7)
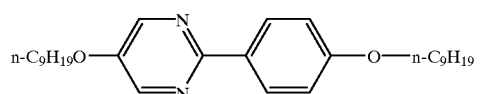

(8)
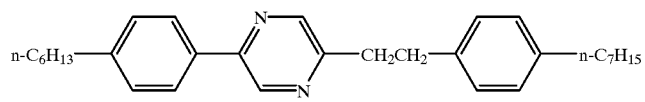

(9)

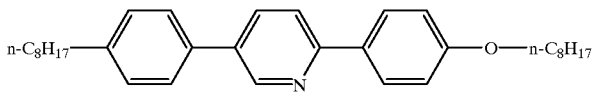

The phase sequence of the liquid crystal material having the smectic C phase is suitably crystal phase-smectic phase C phase-nematic phase-isotropic phase from a lower temperature side. Examples of the liquid crystal material having such a phase sequence include, but are not limited to, compounds represented by the above-mentioned general formula I and compounds represented by the following formulae (10) to (12). Moreover, a single compound is also acceptable, so long as it can show the above-mentioned phase sequence in the case that it is mixed with another compound.

(10)

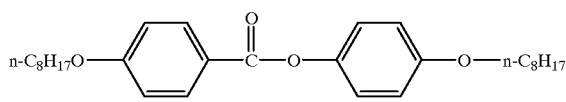

(11)

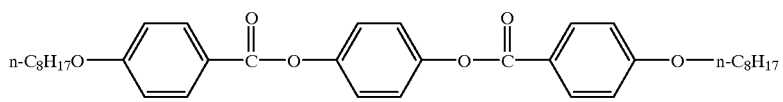

(12)

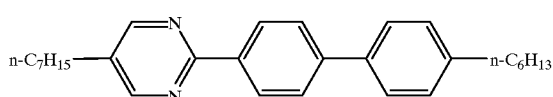

Figure 1B:
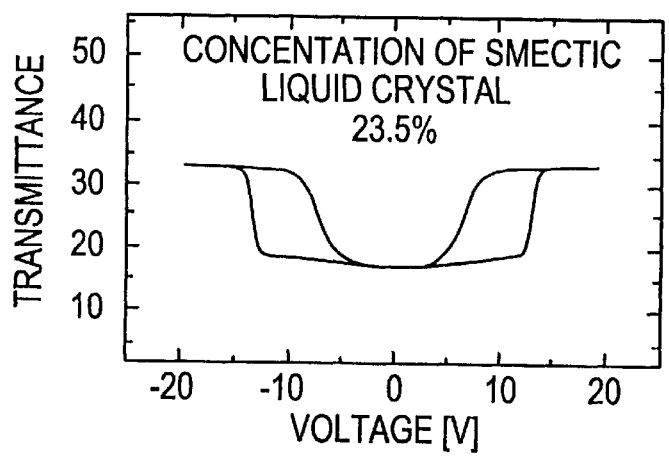
Figure 1C:
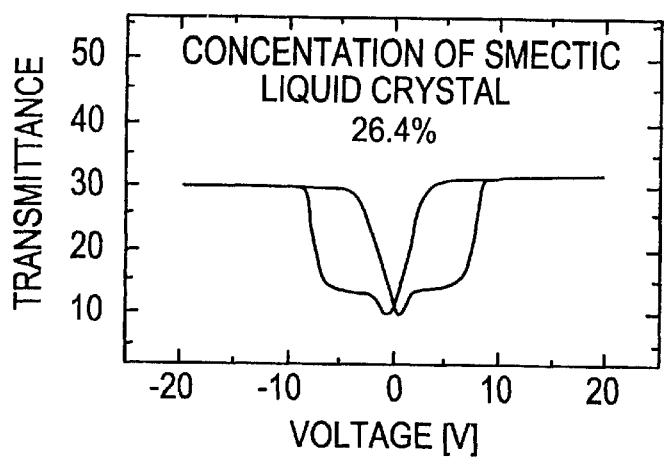
Figure 2A:
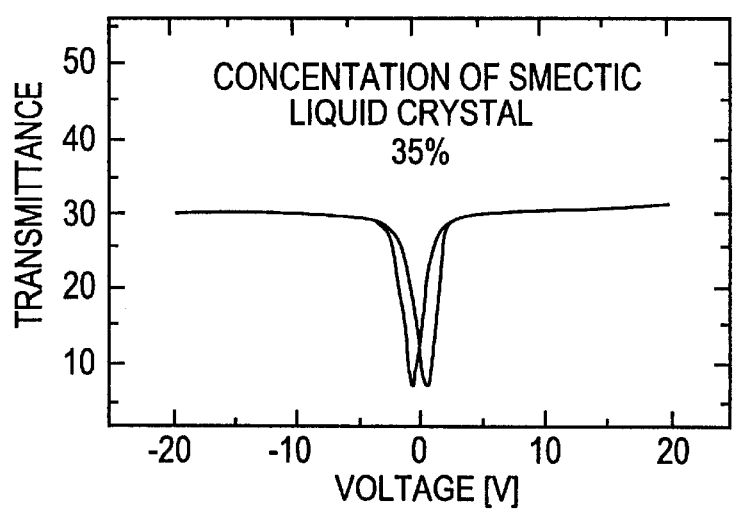
Figure 2B:
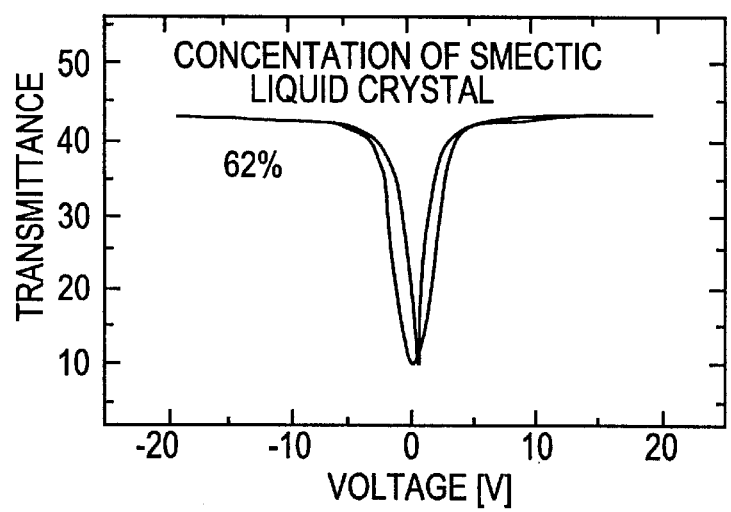
Figure 2C:
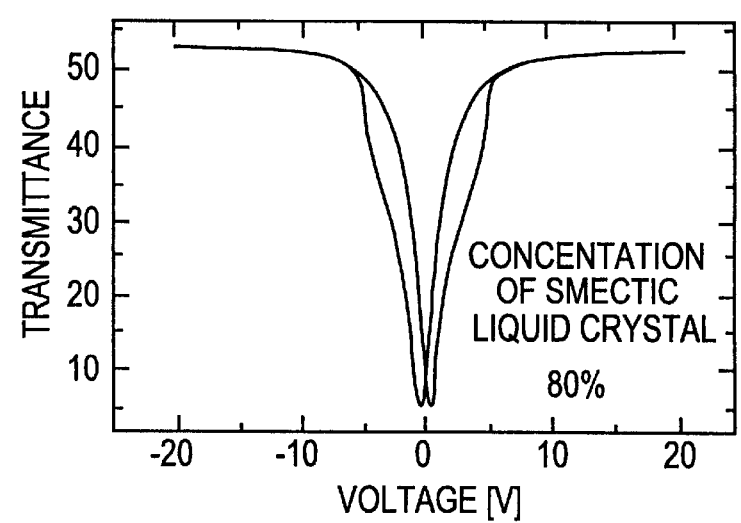
Figure 3A:
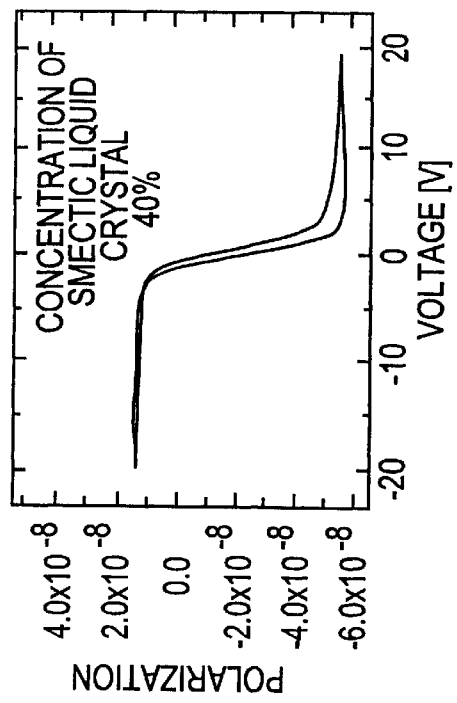
FIG. 3 shows a relation between a composition and voltage-polarization characteristics of the liquid crystal material of the present invention.
Figure 3B:
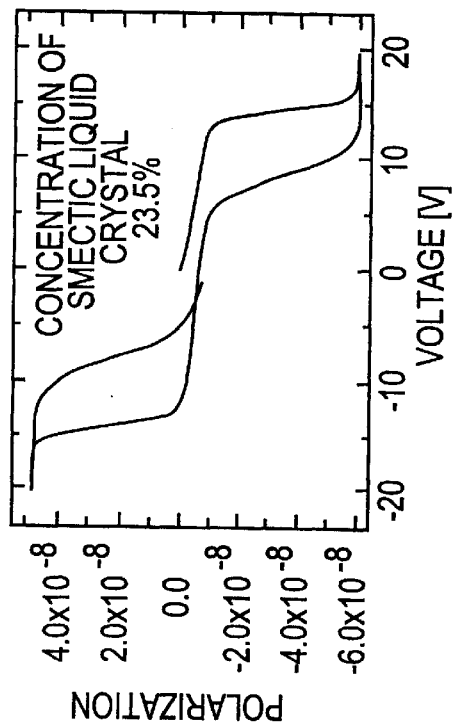
Figure 3C:
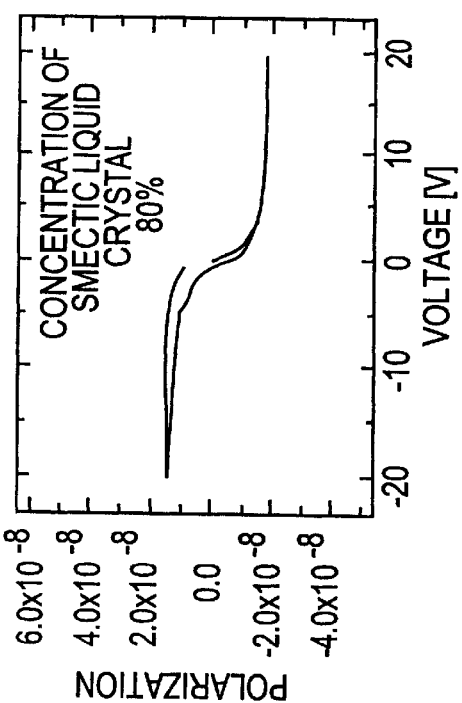
Figure 3D:
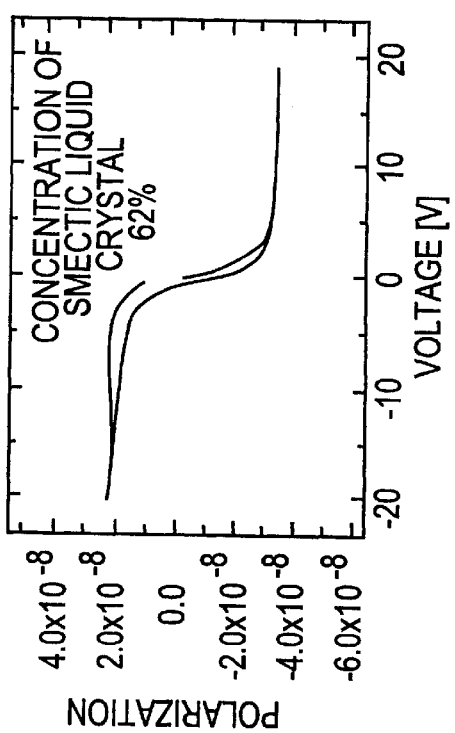

It has been elucidated that when the antiferroelectric liquid crystal material is mixed with the smectic liquid crystal material having the above-mentioned formula, the following phenomena take place. When the smectic liquid crystal material is mixed at a concentration of 30% or more, a antiferroelectric phase vanishes. In addition, in the case of this concentration or more, there is observed a phenomenon that an optical axis is continuously rotated to an applied voltage. That is to say, electro-optical characteristics change to the concentration as shown in FIGS. 1 and 2. In a region in which the concentration of the smectic liquid crystal material is less than 30%, a well-known double hysteresis is observed. Therefore, it can be considered that the antiferroelectric state is present in this concentration region. However, when the concentration of the smectic liquid crystal material is 30% or more, V-shaped characteristics are observed.

Similarly, when polarization values to applied voltages are measured, such a change as shown in FIG. 3 is observed. That is to say, at a smectic liquid crystal concentration of about 30%, the double hysteresis transfers to a substantially hysteresis-free state. In view of this fact, it is also apparent that the antiferroelectric state transfers at 30%.

Figure 4:
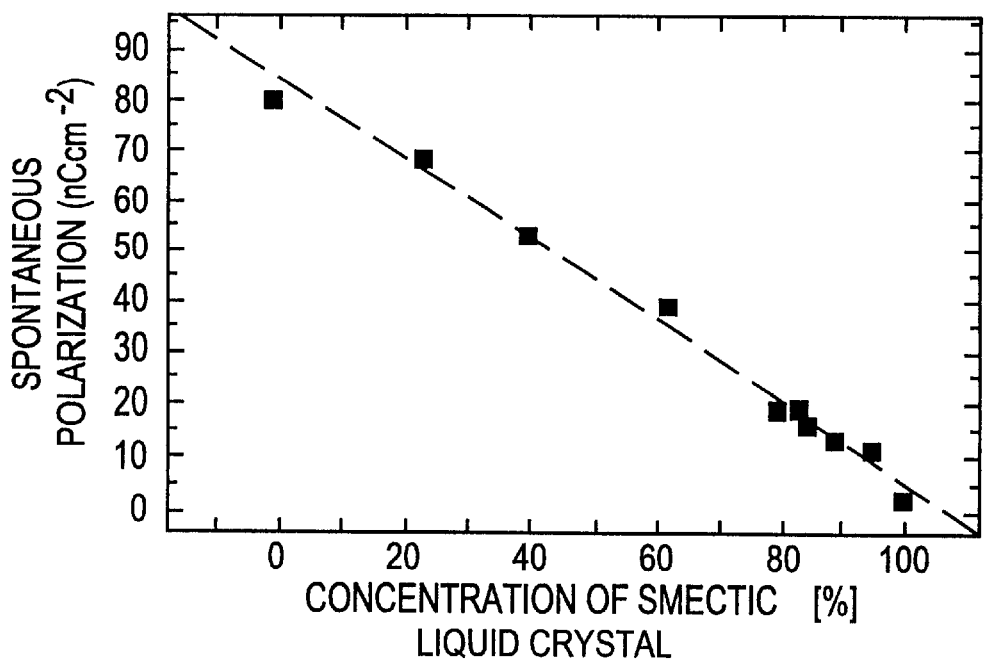
FIG. 4 shows a relation between a composition and a spontaneous polarization value of the liquid crystal material of the present invention.

By calculating inverted polarization values on the basis of the results in FIG. 3, such results as shown in FIG. 4 are obtained. From these results, it is confirmed that the polarization values can be controlled in substantial proportion to the concentration of the antiferroelectric liquid crystal material.

Figure 5:
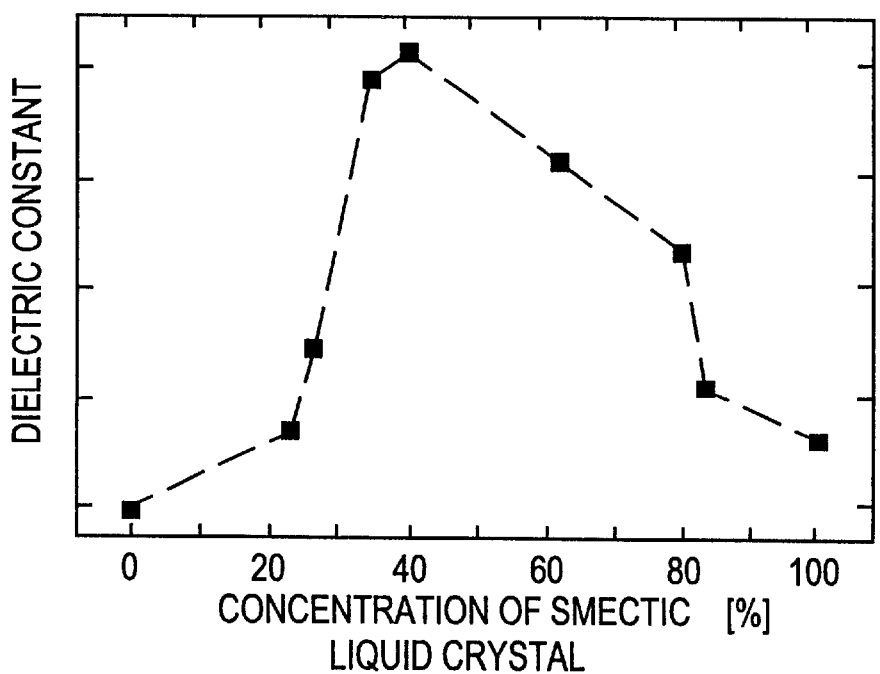
FIG. 5 shows a relation between a composition and a dielectric constant of the liquid crystal material of the present invention.

Furthermore, by measuring a dielectric constant in each concentration region, the results in FIG. 5 are obtained. It is apparent from the results that the dielectric constant rises rapidly from a smectic liquid crystal concentration of about 30%. That is to say, it is understood that at a concentration of less than 30%, the dielectric constant is low because of the antiferroelectric state, but at a concentration of 30% or more, the liquid crystal material transfers to a state in which it is sensitive to the applied voltage.

From the foregoing, it is apparent that at a smectic liquid crystal concentration of 30%, the liquid crystal material transfers to a phase showing the V-shaped characteristics which permit the display of a half tone. Furthermore, it can also be understood that by increasing the smectic liquid crystal concentration, the polarization value can be controlled.

In the fifth invention, an optically active phenylpyrimidine compound is included. As described above, however, this kind of substance does not have any smectic A phase in the phase sequence. On the other hand, most of substances showing an antiferroelectric phase have the smectic A phase. Therefore, in a concentration region having a high polarization in which the concentration of the optically active phenylpyrimidine compound is 30% or more, the smectic A phase is present. On the other hand, in a region having a low polarization value in which the concentration of the optically active phenylpyrimidine compound is high, the phase sequence has no smectic A phase. Therefore, there is a problem that, in the case of a low polarization composition ratio, an orientation state is bad. However, by mixing the antiferroelectric liquid crystal and the optically active phenylpyrimidine compound with a third smectic liquid crystal material having the smectic A phase, the smectic A phase can be introduced into the phase sequence, whereby the orientation state can be remarkably improved.

Furthermore, in the present invention, even when the liquid crystal material having a ferrielectric phase is used in place of the antiferroelectric liquid crystal material, the improvement of the orientation state can be realized. Examples of the compound having the ferrielectric phase include compounds represented by the above-mentioned formula (1) (which show the ferrielectric phase on a higher temperature than the antiferroelectric phase) and compounds represented by the following formula (13), but they are not restrictive.

(13)

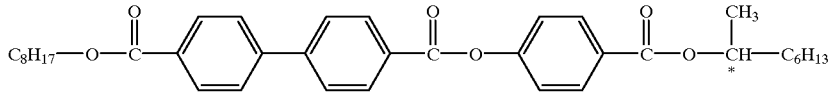

Moreover, the ferroelectric phase may be exerted by a mixed material of two kinds of compounds which do not show the ferrielectric phase in a single state. The details regarding the ferrielectric phase by such mixed materials are described in "Antiferroelectric Chiral Smectic Liquid Crystals", Atsuo Fukuda et al., J. Mater, Chem., 1994, 4(7), pp.997–1016, pp. 1006–1012.

An optical axis of a liquid crystal layer in the present invention is not an optical axis of each liquid crystal molecule but a direction in which a refractive index of the whole liquid crystal layer becomes maximum, and the liquid crystal material has refractive indexes in two directions substantially vertical to the optical axis direction which are smaller than the refractive index in the optical axis direction. Therefore, the whole liquid crystal layer has birefringence, and when the direction of this optical axis is altered by the application of an electric field, an electro-optical effect can be obtained.

The spontaneous polarization of the liquid crystal material according to the present invention is required to be in the range of 0.06 (nC/cm$^2$) to 96 (nC/cm$^2$), depending on the number of scanning lines of a selected TFT and a response time of the desired liquid crystal material. If the spontaneous polarization is less than 0.06 (nC/cm 2), a problem that the response time is very slow tends to take place. On the contrary, if it is more than 96 (nC/cm 2), the number of scanning lines which can be driven decreases, so that such a liquid crystal material cannot be applied to a highly precise. panel. In the case of a high performance display in which many scanning lines, a low voltage drive, a widely applicable temperature range and a high-speed response are required, the spontaneous polarization of 1.9 (nC/cm$^2$) to 21 (nC/cm$^2$) is particularly preferable.

The value of the above-mentioned spontaneous polarization can be obtained in the following manner:

The lower limit of the spontaneous polarization can be decided on the basis of a response speed. It is necessary conditions that the response is made within a time of 1 field during an AC drive, i.e., the half of 1 frame. Since a frame frequency is usually 30 Hz, the response time is required to be $(1/30)\times10^3/2 \approx 16.7$ (ms) or less. The response speed can be given by the following formula as in the case of SSFLC.

$$\tau \simeq \frac{\eta}{P_S \cdot E} \quad (A)$$

Under conditions that a viscosity q of the liquid crystal material is 100 mPa·s and a voltage is 20 V and a cell gap is 2 μm, an electric field E is 107 V/m, and if the spontaneous polarization Ps is less than 0.06 nC/cm$^2$, a response time τ is longer than 16.7 ms. Moreover, when the high-speed response is required, if the response is not made within the time of the half of 1 field, flicker appears on a display. If a wide temperature range is required and the viscosity is as high as 400 mPa·s which is higher than the above conditions and the spontaneous polarization is 1.9 nC/cm$^2$ or less, and under conditions of a low voltage drive, a voltage of 5 V and a cell gap of 2 μm, the response time is longer than 8.35 ms, so that the flicker tends to appear on the display.

On the other hand, the upper limit of the spontaneous polarization can be decided on the basis of the distribution of write charges. As the write charges from the TFT, two kinds of charges, i.e., a charge Q1 stored in a cell capacity as an electrostatic capacity having no spontaneous polarization and a polarization charge Q2 by the slight response of the spontaneous polarization within a write time are written within the write time. The charge Q1 written into the electrostatic capacity can be represented as follows:

$$Q_1 = C_S \cdot V_d \cdot \left[1 - \exp\left(-\frac{\tau_g}{C_S \cdot R_{on}}\right)\right] \quad (B)$$

wherein Cs is the cell capacity; Vd is a write voltage; $R_{on}$ is an On-state resistance of the TFT; and Tg is the write time.

In general, since 99% or more of the write is made, the charge Q1 can be regarded as follows:

$$Q1 \approx C_s \cdot Vd \quad (C)$$

Here, the charge Q2 which flows by the response of the spontaneous polarization Ps within the write time is 1/k of the total charges Ps·S by the spontaneous polarization wherein S is an area of the cell. In a condition where the response of the liquid crystal is complete, the spontaneous polarization completely responds, and the voltage across both the ends of the cell lowers under the influence of an depolarization field by this spontaneous polarization. The electric charges in the cell in this condition include two kinds of a charge Q3 by the spontaneous polarization and a charge Q4 remaining in the electrostatic capacity. Thus, Q4=Cs·Vs can be established wherein Vs is a final voltage across. both the ends of the cell. On the other hand, Q3=Ps·S can also be established. In consequence, the preservation of the charges can be accomplished, and the following equation can be established.

$$Q1+Q2=Q3+Q4 \quad (D)$$

In the case that alignment layers are present on both the substrates, a capacity Cs of the cell can be represented as follows.

$$C_S = \varepsilon_0 \cdot S \bigg/ \left(\frac{d_{1c}}{\varepsilon_{1c}} + \frac{2 \cdot d_{ol}}{\varepsilon_{ol}}\right) \quad (E)$$

wherein $\varepsilon_0$ is a dielectric constant of vacuum; $\varepsilon_{1c}$ is a relative dielectric constant of the liquid crystal; $d_{1c}$ is a thickness of the liquid crystal layer; $\varepsilon_{01}$ is a relative dielectric constant of the alignment layer; and $d_{01}$ is a thickness of the alignment layer.

On the basis of these relations, the equation showing the spontaneous polarization can be obtained.

$$P_S = \frac{k}{k-1} \cdot (V_d - V_s) \cdot \varepsilon_0 \bigg/ \left( \frac{d_{1c}}{\varepsilon_{1c}} + \frac{2 \cdot d_{ol}}{\varepsilon_{ol}} \right) \quad \text{(F)}$$

In the following, it is assumed that k=4, i.e., ¼ of the total spontaneous polarization responds within the write time as well as $d_{1c}$=2 µm, $d_{o1}$=50 nm, $\epsilon_{o1}$=10, $\epsilon_{o1}$=3, and Vs=1 V. When the voltage is sufficient applied and Vd=20 V, Ps=96.1 nC/cm² can be obtained. On the other hand, when the voltage is Vd=5 V, Ps=20.2 nC/cm² can be obtained. From these results, the above-mentioned upper limit can be decided.

Furthermore, by the addition of a large auxiliary capacity, the value of Cs can be increased, whereby a writable spontaneous polarization value represented by the formula F can be increased. However, as described above, the increase of a certain value or more of the auxiliary capacity leads to the increase of a writing constant (a RC constant) from the TFT represented by the formula B. As a result, the write is insufficient, so that the assumption of the formula C cannot be established any more. Under this circumstance, the write charge Q1 from the TFT does not so much increase, and as understood from the formula D of the charge preservation, the formula F changes, and the spontaneous polarization value does not so much increase.

A liquid crystal optical element of the present invention can be applied not only to a light transmitting type having a structure in which a liquid crystal layer is interposed between two transparent substrates having electrodes but also to a light reflecting type in which one substrate is opaque. For example, they have an element structure in which the liquid crystal layer is interposed between the transparent substrate having the electrode and a light reflecting plate having the electrode, or an element structure in which the liquid crystal layer is interposed between the transparent substrate having the electrode and a light absorbing plate having the electrode.

For the constitution of the element, a conventional technique can be applied.

As the electrodes, a material such as indium-tin-oxide (ITO) can be utilized, but an organic conductive thin film such as a polypyrole can also be utilized. In addition, the selected substrate itself is conductive, the substrate can also be utilized as the electrodes. The electrodes can be installed sodas to closely adhere to a dimming layer. The substrate provided with these electrodes is suitably treated so that the liquid crystal may be oriented. In this case, both of the two substrates preferably have a homogeneous orientation, but they may have another orientation state in compliance with a use purpose. For this orientation treatment, a usual alignment layer of a polyimide or the like which can be used for a TN liquid crystal, an STN liquid crystal and the like can be utilized, but a film having a particularly low pretilt angle is desirable.

An alignment layer of the polyimide or the like may be a soluble type in which the polyimide or the like is dissolved in a solvent, or a baked type in which polyimidation is made by baking. In addition, it is desirable to carry out an orientation treatment such as rubbing.

Examples of the material of the substrate for use in the present invention include glasses, plastics and metals. Furthermore, the substrate having a color filter can be used, or a pigment, a dye or the like can be dispersed in the substrate to color the same. The substrate is installed so that the electrodes may be on the side of the dimming layer.

In order to set a predetermined space between the substrates, a rodlike or a spherical spacer made of a glass or a polymeric resin which can be used in a usual liquid crystal device can be employed, and the width of the space is preferably in the range of about 1 µm to about 4 µm.

The material of the light reflecting plate may be an inorganic material or an organic material, so long as it is a material which can reflect the light. Moreover, a reflection intensity and a reflection wavelength can be optionally changed in compliance with the desired characteristics of the element. With regard to the structure of the light reflecting plate, the whole light reflecting plate may be made of the light reflecting material, or the substrate of another material such as a glass may be coated with the light reflecting material. In the case that the coating is given with the light reflecting material, this light reflecting material does not have to be present on the side of the liquid crystal layer. In addition, in the case that the light reflecting material is not present on the side of the dimming layer, the substrate coated with the light reflecting material does not have to be transparent.

The material of the light absorbing plate may be an inorganic material or an organic material, so long as it is a material which can absorb the light. Moreover, an absorption intensity or an absorption wavelength can be optionally changed in compliance with the desired characteristics of the element. With regard to the structure of the light absorbing plate, the whole light absorbing plate may be made of the light absorbing material, or the substrate of another material such as a glass may be coated with the light absorbing material. In the case that the coating is given with the light absorbing material, this light absorbing material does not have to be present on the side of the liquid crystal layer. In addition, in the case that the light absorbing material is not present on the side of the liquid crystal layer, the substrate coated with the light absorbing material does not have to be transparent. When the light reflecting material or the light absorbing material is conductive, it can also be used as the electrode.

Examples of the active element for use in the liquid crystal optical element of the present invention include a thin film transistor (TFT) element and a metal-insulator-metal (MIM) element, but in addition to an active matrix drive, the driving can be accomplished by a simple matrix.

As uses of the liquid crystal optical element of the present invention, there are building materials such as windows and partitions, and display devices for displaying characters and figures.

In the liquid crystal optical element of the present invention, the optical axis continuously changes to the applied voltage. In consequence, the display of the half tone is possible. Furthermore, the element can be combined with the thin film transistor (TFT) element or the metal-insulator-metal (MIM) element to realize the liquid crystal display device.

Next, an embodiment in which the liquid crystal optical element of the present invention is used will be described with reference to drawings.

Figure 6:
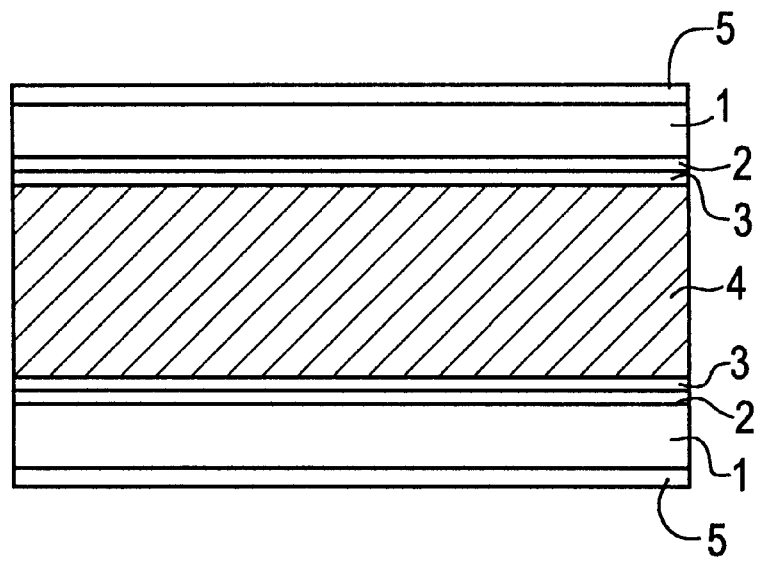
FIG. 6 is a cross-sectional view showing a constitution of a liquid crystal element of the present invention.

FIG. 6 is a sectional view showing the constitution of an electro-optical element using the liquid crystal material of the present invention. Referring to FIG. 6, transparent electrodes 2 are formed on a pair of transparent substrates 1, and alignment layer 3 are also formed on the transparent electrodes 2 (in this drawing, they are formed on both the sides of the substrate, but they may be formed only on one side of the substrate to constitute the element). In addition, the transparent electrodes 2 are arranged so as to face each other, thereby constituting a liquid crystal cell. Inside this liquid crystal cell, the smectic liquid crystal material of the present invention is interposed. Furthermore, a pair of polarizers 5 are stuck on the transparent substrate outside the liquid crystal cell to constitute the electro-optical element.

Figure 8:
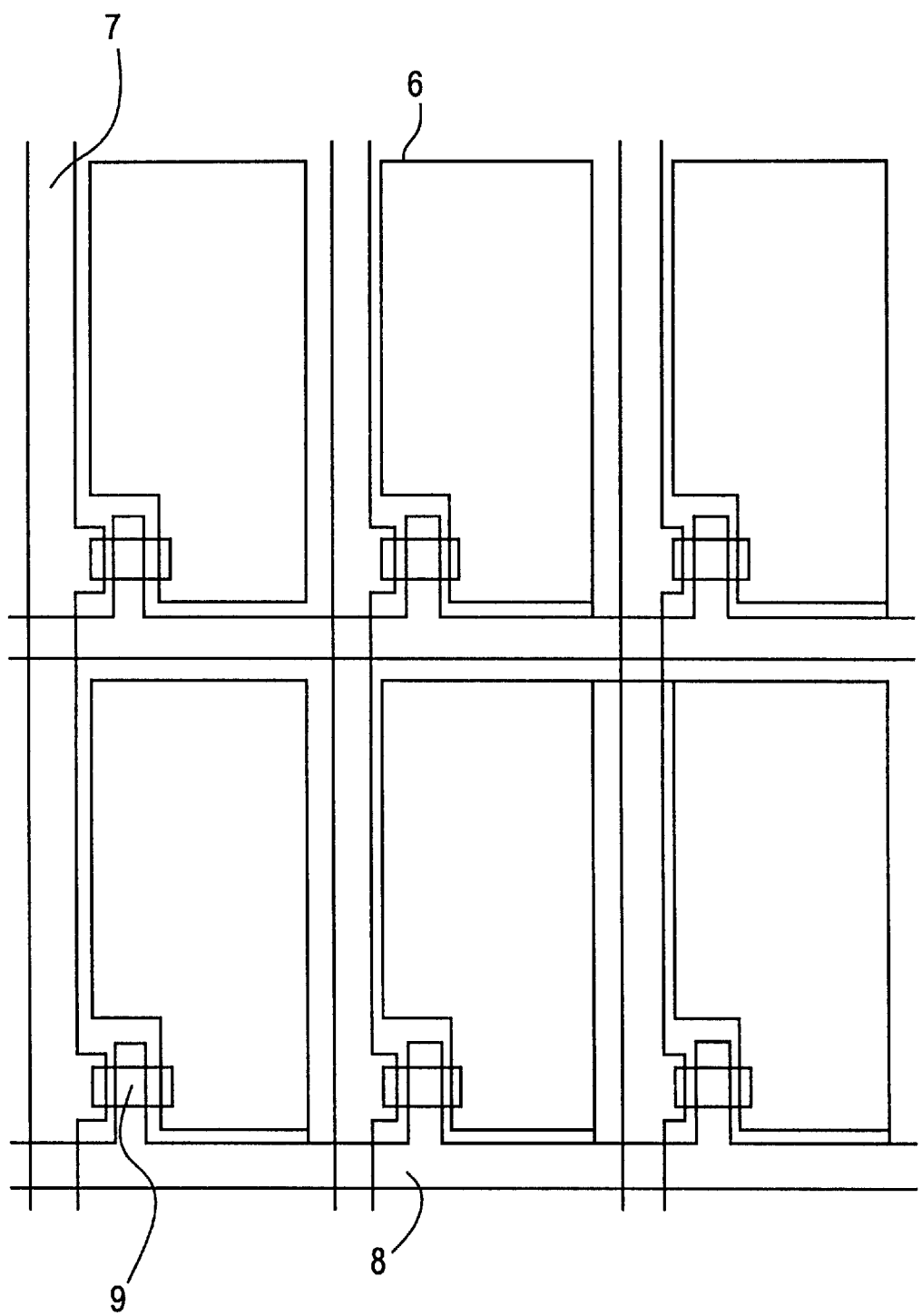
FIG. 8 is an illustrative view of a thin film transistor array regarding Example 4 of the present invention.

FIG. 8 shows a TFT array having a structure in which the electro-optical element of the present invention is combined with a TFT array substrate. This structure is constituted of a TFT substrate and an opposite substrate, and the TFT substrate has a gate bus line, a drain bus line and the TFT array, as shown in the figure. Each pixel has at least one pixel electrode. In this liquid crystal panel, layer normals of the layer structure of the smectic liquid crystal material are directed in a substantially certain direction, and projection components of liquid crystal molecules to the substrate surface are monostabilized in a state where they are directed to a substantially certain direction. The operation of this embodiment is as follows: To each drain bus line, there is applied, in correspondence with each gate line, a waveform obtained by dividing the drive at a predetermined frequency (it is usually 30 Hz but is changed to 60 Hz or the like sometimes in the case that a flicker is considered, or it is a lower frequency in the case that the response of the liquid crystal is slow) by the number of gate lines. On the other hand, to each gate line, there is applied such a waveform as to switch on the TFT when its line is selected, whereby a waveform of the drain line is applied to the liquid crystal through a display electrode. Until the gate line is selected again, the voltage is held in a liquid crystal section. In consequence, even if the liquid crystal has non memory function, the holding operation of the display is possible. Furthermore, the liquid crystal material used here shows the characteristics that the transmittance to the applied voltage has a V-shaped form, and hence it permits the display of the analog half tone, whereby the display of the half tone can be realized by applying a waveform corresponding to each gradation to a data bus line.

Next, the present invention will be described in detail in accordance with examples, but the scope of the present invention should not be limited to these examples, so long as they do not deviate from the gist of the present invention.

Phase transition temperatures of liquid crystal materials described in the examples of the present invention were measured by temperature rise and temperature drop at a rate of 2° C. per minute by the use of DSC. In addition, the phase transition temperatures were also obtained from capacities measured by the temperature rise and temperature drop at a rate of 2° C. per minute. Each liquid crystal phase was identified by observing, through a polarization microscope, an electric field response at a time when a voltage is applied to a liquid crystal optical element.

A drive voltage, a contrast and a response speed of the liquid crystal optical elements described in the examples are defined as follows:

Drive voltage:

It is a voltage at which the light transmittance of the element is 90%, when in an applied voltage-light transmittance curve, the lowest light transmittance is 0% (the minimum light transmittance) and a light transmittance saturated with voltage application is 100% (the maximum light transmittance).

Contrast:

It is a value obtained by dividing the light transmittance saturated with the voltage application (the maximum light transmittance) by the minimum light transmittance.

Response speed:

It is a sum of a time taken until the light transmittance changes from 0% to 90%, and a time taken until the light transmittance changes from 90% to 0%, when there is applied a voltage with which the light transmittance is saturated from a state of no voltage application.

EXAMPLE 1

The following liquid crystal materials (I) and (II) were mixed with each other in a ratio of (I):(II)=34:66% by weight to obtain a liquid crystal material (III) having a smectic C phase. To 80 parts by weight of the thus obtained liquid crystal material (III), 20 parts by weight of an antiferroelectric liquid crystal material CS-4001 made by Chisso Petrochemical Corporation was added, thereby obtaining a desired smectic liquid crystal material [hereinafter referred to as "the liquid crystal material (A)"].

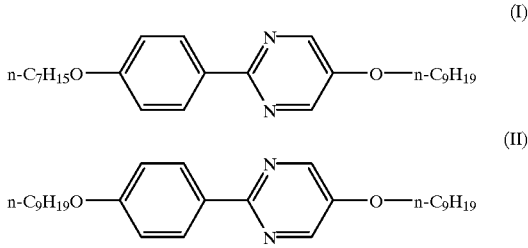

The phase sequences of the respective liquid crystal materials will be shown as follows:

| | Phase Transition Temperature (° C.) |
|---|---|
| Liquid Crystal Material (I) | Cryst. (55.8) SC (95.1) SA (98.0) I |
| Liquid Crystal Material (II) | Cryst. (60.3) SC (95.6) SA (98.7) I |
| Liquid Crystal Material (III) | SC (72.5) N (78.4) I |
| Liquid Crystal Material CS-4001 | SCA* (67.1) SCr* (68.0) SC* (36.1) SA (86.6) I |
| Liquid Crystal Material (A) | SX1* (0.2) SX2* (72.5) I |

In the above-mentioned phase sequences, Cryst. is a crystal phase, SC is a smectic C phase, SX1 and SX2 are unidentified smectic C phases, SA is a smectic A phase, SCA is an antiferroelectric smectic C phase, SCr is a ferrielectric phase, N is a nematic phase, and I is an isotropic phase. In addition, the symbol * in the table denotes the presence of a chirality of the corresponding phase.

The liquid crystal material (A) was heated with stirring at 100° C., and after sufficient mixing, it was poured into a liquid crystal cell which comprised a pair of glass substrates each having a homogeneously oriented electrode layer previously heated to 100° C. and which had a space of 2 mm therebetween, followed by slowly cooling it to room temperature at a rate of 1° C. per minute. Next, the liquid crystal cell was sandwiched between a pair of rectangularly crossed polarizers arranged so that the direction of an optical axis of the liquid crystal material in a state of no voltage application might be coincident with an polarization axis of one polarizer, thereby obtaining a desired liquid crystal optical element.

Figure 7:
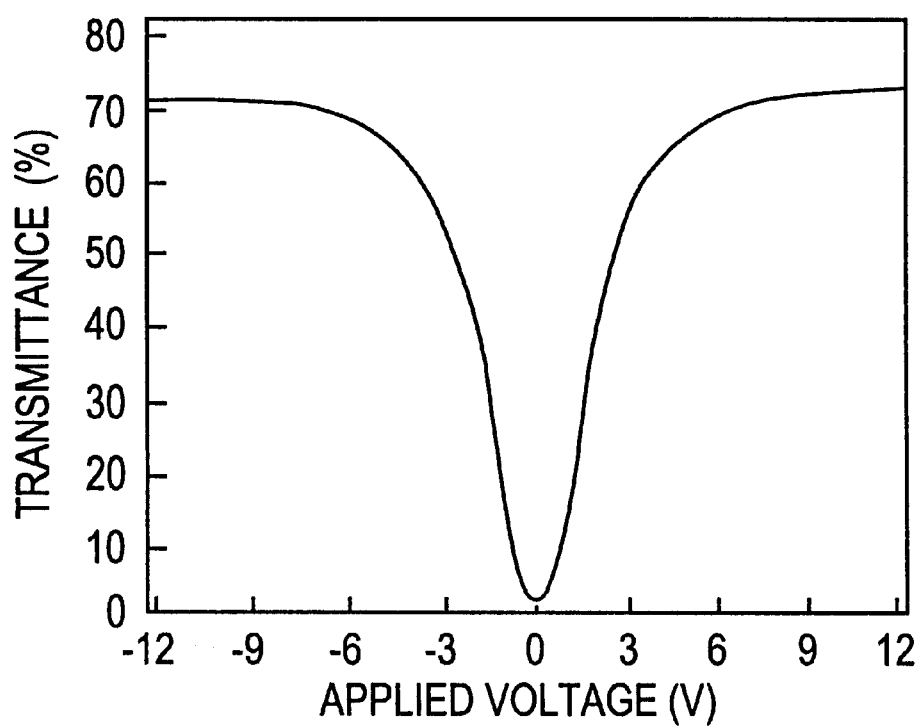
FIG. 7 is a graph showing the change of a light transmittance to an applied voltage of the liquid crystal element regarding Example 2 of the present invention.

The electro-optical characteristics of the thus obtained liquid crystal optical element were measured by applying a triangular wave having a frequency of 1.0 Hz. In consequence, as the change of a light transmittance to the applied voltage is shown in FIG. 7, V-shaped characteristics were obtained. The electro-optical characteristics at 25° C. are as follows: Incidentally, the measurement of a spontaneous polarization value was made by applying the triangular wave having a frequency of 1.0 Hz.

Drive voltage (V): 9

Contrast: 23

Response speed (ms): 1.8

Spontaneous polarization ($nC/cm^2$): 17

The spontaneous polarization value of the liquid crystal material CS-4001 showing antiferroelectricity which was used herein was relatively small, 79.7 $nC/cm^2$, but in this example, the spontaneous polarization value smaller than 21 $nC/cm^2$ could be obtained.

Figure 9:
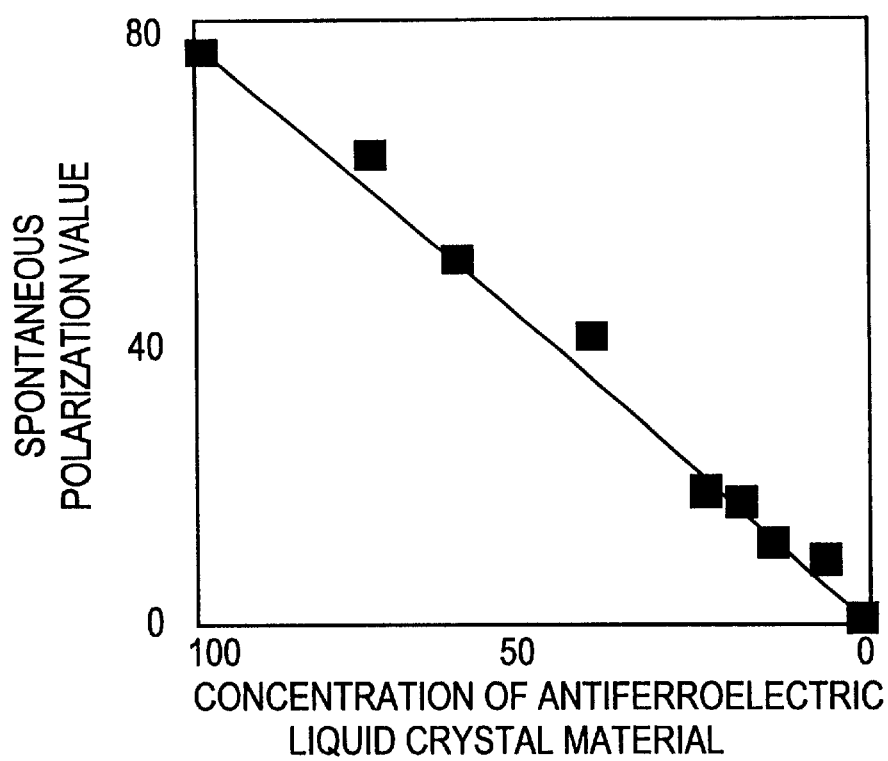
FIG. 9 shows a relation between a composition and a spontaneous polarization value of the liquid crystal material regarding Example 1 of the present invention.

Furthermore, the change of the spontaneous polarization value was measured, changing a mixing concentration of the liquid crystal material CS-4001 showing the antiferroelectricity, and the thus measured results are shown in FIG. 9. As is apparent from the drawing, the spontaneous polarization value of this composition changes substantially in proportion to a mixing ratio. In addition, with regard to the electro-optical characteristics of the smectic C phase to the concentration of the liquid crystal material (III), the following results were obtained: When the concentration was 35%, the V-shaped characteristics could be obtained, but when the concentration was 26.4%, characteristics of tristability were obtained. On the other hand, when the concentration was either of 83.5% and 95%, the V-shaped characteristics could be obtained, but when the concentration was 100%, any response could not be obtained because of no presence of the spontaneous polarization.

EXAMPLE 2

To 80 parts by weight of a liquid crystal material (III) used in Example 1, 20 parts by weight of the following antiferroelectric liquid crystal material (IV) was added, thereby obtaining a desired smectic liquid crystal material [hereinafter referred to as "the liquid crystal material (B)"].

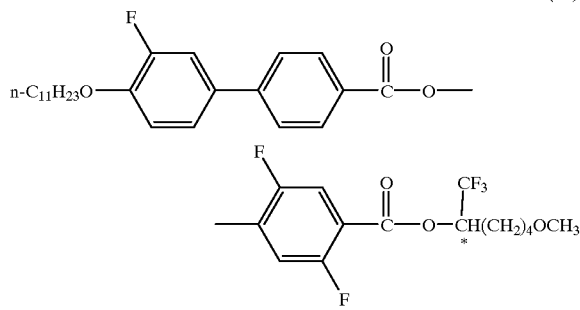

(IV)

The phase sequences of liquid crystal materials will be shown as follows.

| Phase Transition Temperature (° C.) | |
|---|---|
| Liquid Crystal Material (III) | SC (72.5) N (78.4) I |
| Liquid Crystal Material (IV) | SCA* (36.1) SA (47.2) I |
| Liquid Crystal Material (B) | SX6* (6.5) SX3* (67.0) SX4* (75.5) I |

In the above-mentioned phase sequences, the symbols are the same as in Example 1.

The liquid crystal material (B) was heated with stirring at 100° C., and after sufficient mixing, it was poured into a liquid crystal cell which comprised a pair of glass substrates each having a homogeneously oriented electrode layer previously heated to 100° C. and which had a space of 2 mm therebetween, followed by slowly cooling it to room temperature at a rate of 1° C. per minute. Next, the liquid crystal cell was sandwiched between a pair of rectangularly crossed polarizers arranged so that the direction of an optical axis of the liquid crystal material in a state of no voltage application might be coincident with an polarization axis of one polarizer, thereby obtaining a desired liquid crystal optical element.

Figure 10:
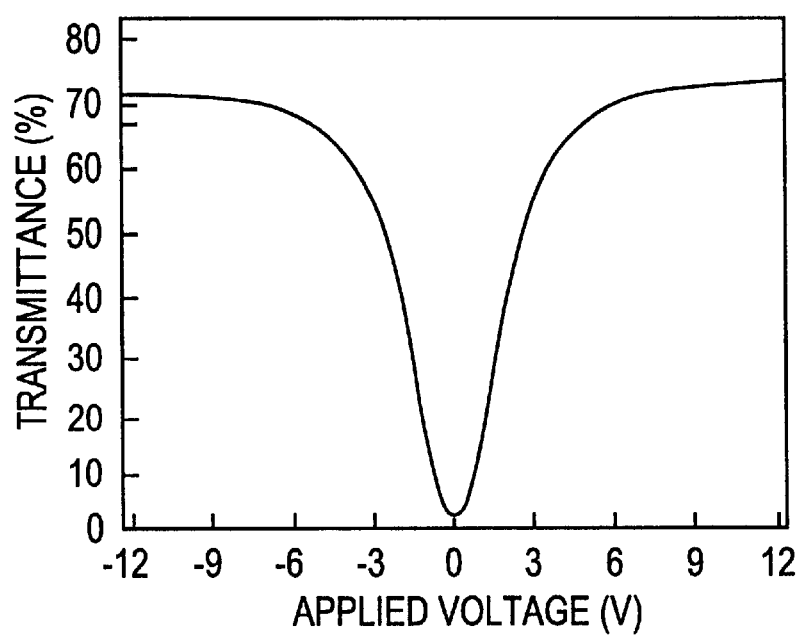
FIG. 10 is a graph showing the change of a light transmittance to an applied voltage of the liquid crystal material regarding Example 2 of the present invention.

The electro-optical characteristics of the thus obtained liquid crystal optical element were measured by applying a triangular wave having a frequency of 1.0 Hz. In consequence, as the change of a light transmittance to the applied voltage is shown in FIG. 10, V-shaped characteristics were obtained. The electro-optical characteristics at 25° C. are as follows: Incidentally, the measurement of a spontaneous polarization value was made by applying the triangular wave having a frequency of 1.0 Hz.

| | |
|---|---|
| Drive voltage (V): | 9 |
| Contrast: | 23 |
| Response speed (ms): | 1.8 |
| Spontaneous polarization (nC/cm$^2$): | 17 |

Figure 11:
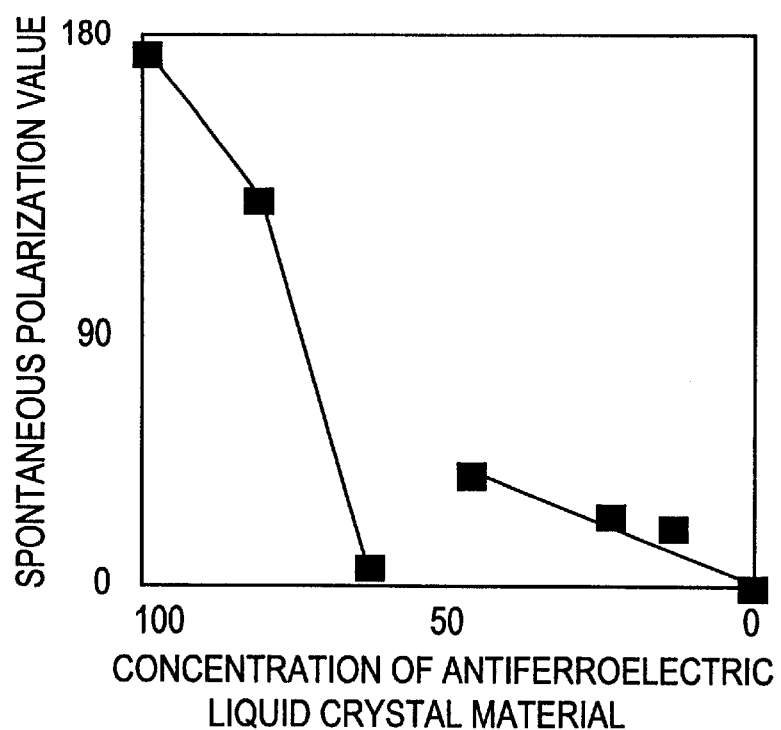
FIG. 11 shows a relation between a composition and a spontaneous polarization value of the liquid crystal material regarding Example 2 of the present invention.
Figure 12:
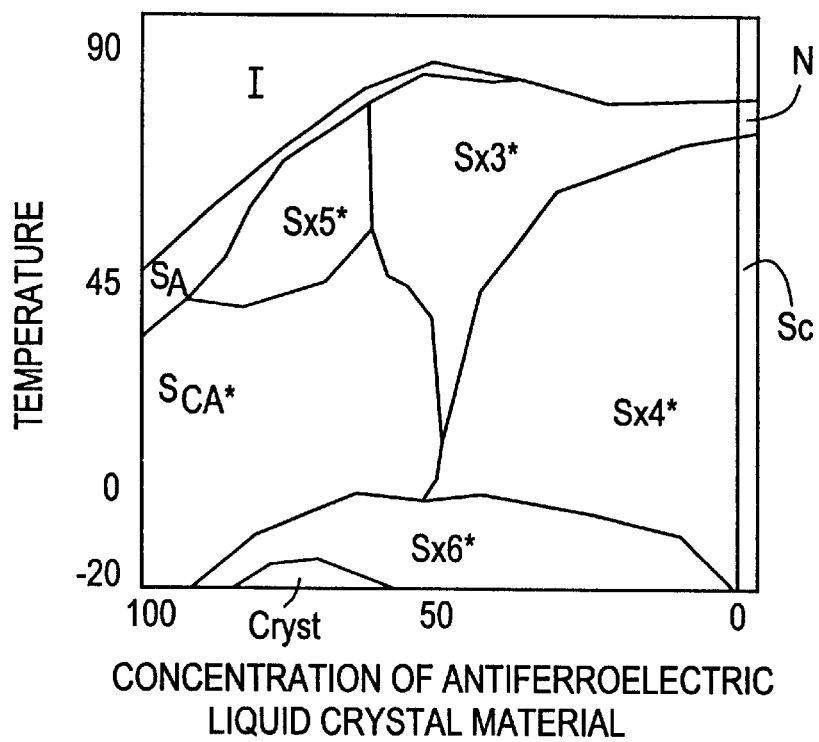
FIG. 12 shows a state of a mixing concentration and a phase change of the liquid crystal material regarding Example 2 of the present invention.

Furthermore, the change of the spontaneous polarization value was measured, changing a mixing concentration of the liquid crystal material (IV) showing an antiferroelectricity, and the thus measured results are shown in FIG. 11. As is apparent from the drawing, the spontaneous polarization value of this composition changes steeply without proportion to a mixing ratio. In addition, FIG. 12 shows a phase change state in the case that a mixing concentration of the liquid crystal material (III) having a smectic C phase was changed. When the mixing concentration was a little less than 50%, an SmX3* phase appeared, and this SmX3* phase showed V-shaped characteristics.

EXAMPLE 3

To 80 parts by weight of a liquid crystal material (III) used in Example 1, 20 parts by weight of the following antiferroelectric liquid crystal material (V) was added, thereby obtaining a desired smectic liquid crystal material [hereinafter referred to as "the liquid crystal material (C)"].

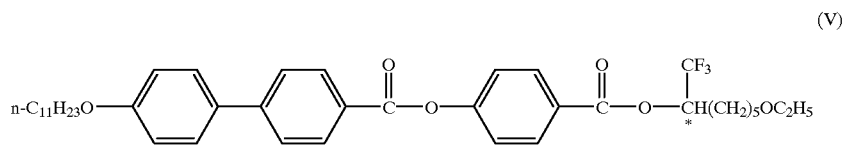

(V)

The phase sequences of liquid crystal materials will be shown as follows.

| Phase Transition Temperature (° C.) | |
|---|---|
| Liquid Crystal Material (III) | SC (72.5) N (78.4) I |
| Liquid Crystal Material (IV) | SCA* (73.0) SA* (79.1) SA (83.1) I |
| Liquid Crystal Material (C) | Cryst. (−10.2) SX3* (55.5) SX4* (83.1) I |

In the above-mentioned phase sequences, the symbols are the same as in Example 1.

The liquid crystal material (C) was heated with stirring at 100° C., and after sufficient mixing, it was poured into a liquid crystal cell which comprised a pair of glass substrates each having a homogeneously oriented electrode layer previously heated to 100° C. and which had a space of 2 mm therebetween, followed by slowly cooling it to room temperature at a rate of 1° C. per minute. Next, the liquid crystal cell was sandwiched between a pair of rectangularly crossed polarizers arranged so that the direction of an optical axis of the liquid crystal material in a state of no voltage application might be coincident with an polarization axis of one polarizer, thereby obtaining a desired liquid crystal optical element.

Figure 13:
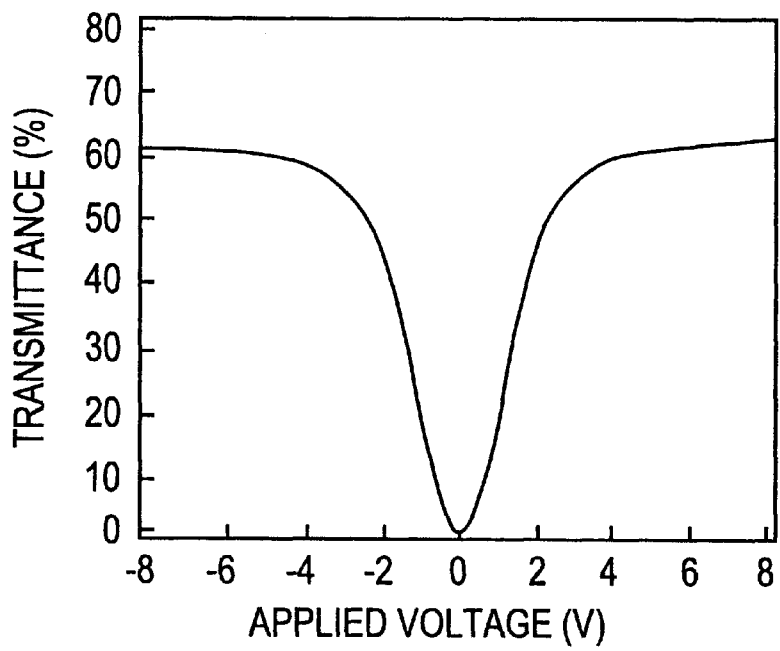
FIG. 13 is a graph showing the change of a light transmittance to an applied voltage of the liquid crystal material regarding Example 3 of the present invention.

The electro-optical characteristics of the thus obtained liquid crystal optical element were measured by applying a triangular wave having a frequency of 1.0 Hz. In consequence, as the change of a light transmittance to the applied voltage is shown in FIG. 13, V-shaped characteristics were obtained. The electro-optical characteristics at 25° C. are as follows. Incidentally, the measurement of a spontaneous polarization value was made by applying the triangular wave having a frequency of 1.0 Hz.

| | |
|---|---|
| Drive voltage (V): | 4.5 |
| Contrast: | 58 |
| Response speed (ms): | 2.3 |
| Spontaneous polarization (nC/cm$^2$): | 20.4 |

Figure 14:
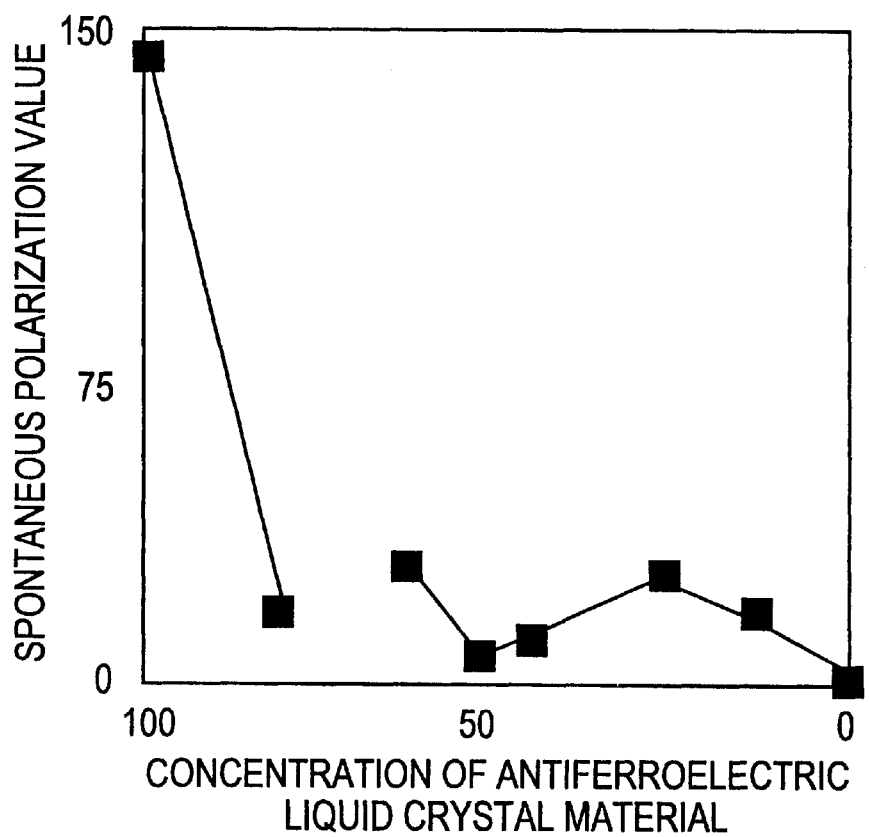
FIG. 14 shows a relation between a composition and a spontaneous polarization value of the liquid crystal material regarding Example 3 of the present invention.

Furthermore, the change of the spontaneous polarization value was measured, changing a mixing concentration of the liquid crystal material (V) showing an antiferroelectricity, and the thus measured results are shown in FIG. 14. As is apparent from the drawing, the spontaneous polarization value of this composition changes steeply without proportion to a mixing ratio. In this example, V-shaped characteristics were shown at a liquid crystal material (V) concentration of 40% or less.

COMPARATIVE EXAMPLE 1

The following smectic liquid crystal material (VI) was mixed with an antiferroelectric liquid crystal material (III) used in Example 2 and an antiferroelectric liquid crystal material (IV) used in Example 1 in a ratio of (VI):(III):(IV)= 40:40:20% by weight to obtain a smectic liquid crystal material [hereinafter referred to as "the liquid crystal material (D)"].

The phase sequences of the respective liquid crystal materials will be shown as follows:

| Phase Transition Temperature (° C.) | |
|---|---|
| Liquid Crystal Material (VI) | Cryst. (27.5) SC* (81.7) SA (84.2) I |
| Liquid Crystal Material (D) | SX (45.2) SC* (63.4) SA (68.2) I |

In the above-mentioned phase sequences, the symbols are the same as in Example 1.

The liquid crystal material (D) was heated with stirring at 100° C., and after sufficient mixing, it was poured into a liquid crystal cell which comprised a pair of glass substrates each having a homogeneously oriented electrode layer previously heated to 100° C. and which had a space of 2 mm therebetween, followed by slowly cooling it to room temperature at a rate of 1°C. per minute. Next, the liquid crystal cell was sandwiched between a pair of rectangularly crossed polarizers arranged so that the direction of an optical axis of the liquid crystal material in a state of no voltage application might be coincident with an polarization axis of one polarizer, thereby obtaining a desired liquid crystal optical element.

The electro-optical characteristics of the thus obtained liquid crystal optical element were measured by applying a triangular wave having a frequency of 1.0 Hz. The electro-optical characteristics at 25° C. are as follows:

| | |
|---|---|
| Drive voltage (V): | 2.9 |
| Contrast: | 45 |
| Response speed (ms): | 2.5 |
| Spontaneous polarization (nC/cm$^2$): | 21.0 |

In this liquid crystal material, a large spontaneous polarization value was about 6 times larger than in the liquid crystal materials of the present invention.

EXAMPLE 4

The fourth example will be described as follows: For 480 gate bus lines and 640 drain bus lines, chromium (Cr) was used by a sputtering process, and a line width was set to 10 μm, and for a gate insulating film, silicon nitride (SiNx) was used. One pixel had a size of a length of 330 μm and a width of 110 μm, and a TFT (a thin film transistor) was made from amorphous silicon, and pixel electrodes which were transparent electrodes were made from indium tin oxide (ITO) by the sputtering process. A glass substrate on which the TFT array was formed was used as a first substrate. On a second substrate which was opposite to this first substrate, a light shielding film of chromium and then a transparent electrode (a common electrode) of ITO were formed, and a color filter was further formed thereon in a matrix state by a dyeing method and a protective layer was further formed on the color filter. Afterward, polyamic acid was applied by a spin coat method and then baked at 200° C. for imidation, to form (VI)

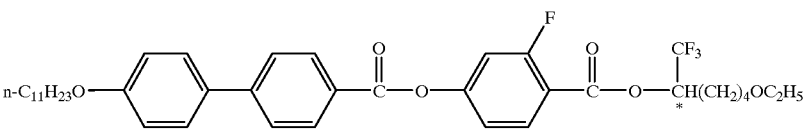

a polyimide film. This polyimide film was rubbed with a roller having a diameter of 50 mm around which a buff cloth using a nylon was wound, and at this time, the rubbing was done under conditions of a roller rotational frequency of 600 rpm, a stage movement velocity of 40 mm/sec and an indentation depth of 0.7 mm by two rubbing operations in such a direction as to be a cross rubbing of 10°. According to measurement by a contact step meter, the thickness of an alignment layer was about 500 Å, and a pretilt angle measured by a crystal rotation method was 1.5°. Next, Micropearl (trade name) which was spherical spacers having a diameter of about 2 μm was sprayed on one of the pair of glass substrates, and a thermosetting sealing material on which cylindrical glass rod spacers having a diameter of about 2 μm were dispersed was applied on the other glass substrate. Both the substrates were arranged so that they might face each other and so that a rubbing treatment direction might mutually be a cross rubbing angle of 10°, and the sealing material was set by a heat treatment to form a panel having a gap of 2 μm. Next, a smectic liquid crystal material of Example 2 was poured into this panel in an isotropic phase in vacuo. A display on the obtained liquid crystal panel was good, and it secures a sufficient contrast (contrast ratio=80 or more), had a wide viewing angle, and was free from an image sticking and an after-image. Since the number of the scanning lines was 480, the writing time of the TFT was 30 Its, which was shorter than the other liquid crystal optical elements having V-shaped characteristics which had been reported so far. However, a spontaneous polarization value was considerably smaller than conventional values, and therefore it could be presumed that sufficient electric charges could be fed within the writing time.

COMPARATIVE EXAMPLE 2

A liquid crystal material in Comparative Example 1 was poured into a liquid crystal panel formed in the same manner as in Example 4 to prepare the panel containing the liquid crystal material. A display on the panel could scarcely be observed. According to measured results, a contrast ratio was 1.5 or less. Since a spontaneous polarization value was large, it could be presumed that electric charges were not fed during a short writing time.

As described above, by the use of a smectic liquid crystal material of the present invention which comprises an antiferroelectric liquid crystal material and a liquid crystal material having a smectic C phase, a high-performance liquid crystal display can be manufactured which has many scanning lines and which can meet the requirements of a low-voltage drive, a wide operating temperature range and a high-speed response.

What is claimed is:

1. A smectic liquid crystal composition which comprises compound (IV):

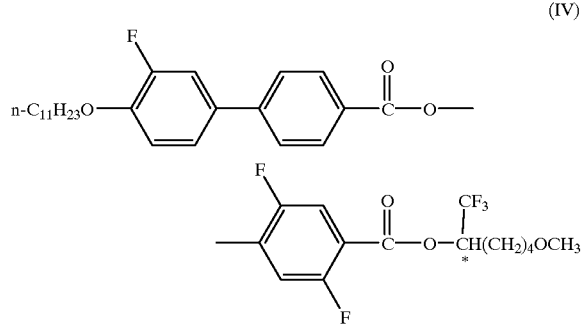

and component (2) a liquid crystal material having a smectic C phase comprising a mixture of compounds (I) and (II):

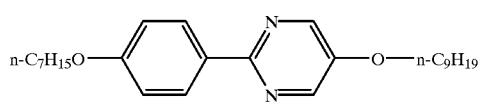

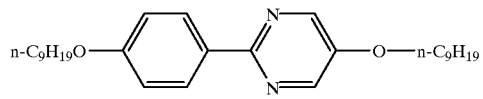

wherein the concentration of the liquid crystal material having the smectic C phase is 30% by weight or more and wherein the plot of the transmittance versus the voltage for the smectic liquid crystal composition has a "V" shape.

2. The smectic liquid crystal composition according to claim 1 wherein the smectic liquid crystal composition has a spontaneous polarization in the range of from 0.06 nC/cm$^2$ to 96 nC/cm$^2$.

3. The smectic liquid crystal composition according to claim 2 wherein the smectic liquid crystal composition has a spontaneous polarization in the range of from 1.9 nC/cm$^2$ to 21 nC/cm$^2$.

4. The smectic liquid crystal composition according to claim 1 wherein the phase sequence of the liquid crystal material having the smectic C phase is crystal phase-smectic C phase-nematic phase-isotropic phase.

5. The smectic liquid crystal composition according to claim 1, which further contains component (3) a liquid crystal material having a smectic A phase, thereby causing the smectic liquid crystal composition to have a smectic A phase; and wherein, without the addition of component (3), the compound represented by the general formula I is present in the smectic liquid crystal composition in a concentration such that the smectic liquid crystal composition has no smectic A phase.

6. A liquid crystal optical element in which a liquid crystal layer comprising a liquid crystal material described in claim 2 is interposed between two substrates provided with electrode layers, at least one of the substrates being transparent.

7. A liquid crystal optical element in which a liquid crystal layer comprising a liquid crystal composition described in claim 3 is interposed between two substrates provided with electrode layers, at least one of the substrates being transparent.

8. The liquid crystal optical element according to claim 6 wherein an optical axis of the liquid crystal layer continuously changes with an applied voltage.

9. The liquid crystal optical element according to claim 7 wherein an optical axis of the liquid crystal layer continuously changes with an applied voltage.

10. The liquid crystal optical element according to claim 6 wherein an active element is disposed on the substrate.

11. The liquid crystal optical element according to claim 7 wherein an active element is disposed on the substrate.

12. The liquid crystal optical element according to claim 8 wherein an active element is disposed on the substrate.

13. The liquid crystal optical element according to claim 9 wherein an active element is disposed on the substrate.

* * * * *

UNITED STATES PATENT AND TRADEMARK OFFICE
CERTIFICATE OF CORRECTION

PATENT NO. : 6,245,258 B1
DATED : June 12, 2001
INVENTOR(S) : Ken-ichi Takatori, Ken Sumiyoshi and Yoriko Hatada It is certified that error appears in the above-identified patent and that said Letters Patent is hereby corrected as shown below:

Column 9,
Lines 35 and 37, delete "(nC/cm2)" insert -- $(nC/cm^2)$ --;

Column 11,
Line 43, delete "sodas" insert -- so as --

Column 16,
Lines 15-20, delete "Drive voltage (V): 9
Contrast: 2.3
Response speed (ms): 1.8
Spontaneous polarization $(nC/cm^2)$; 17"

Insert -- Drive voltage (V): 4.5
Contrast: 58
Reponse speed (ms): 2.3
Spontaneous polarization $(nC/cm^2)$ 20.4 --;
Line 57, after (73.0) delete "SA*" insert -- SC* --

Column 17,
Lines 18-21, delete "Drive voltage (V): 4.5
Contrast: 58
Response speed (ms): 2.3
Spontaneous polarization $(nC/cm^2)$: 20.4"

Insert -- Drive voltage (V) 2.9
Contrast: 45
Response speed (ms): 2.5
Spontaneous polarization $(nC/cm^2)$ 21.0 --

UNITED STATES PATENT AND TRADEMARK OFFICE
CERTIFICATE OF CORRECTION

PATENT NO. : 6,245,258 B1
DATED : June 12, 2001
INVENTOR(S) : Ken-ichi Takatore, Ken Sumiyoshi and Yoriko Hatada It is certified that error appears in the above-identified patent and that said Letters Patent is hereby corrected as shown below:

<u>Column 18,</u>
Lines 14-17, delete "Drive voltage (V): 2.9
Contrast: 45
Response speed (ms): 2.5
Spontaneous polarization (nC/cm$^2$): 21.0"

Insert -- Drive voltage (V): 3.4
Contrast: 2.7
Response speed (ms): 0.85
Spontaneous polarization (nC/cm$^2$): 117 --

<u>Column 19,</u>
Line 9, delete "30 Its" insert -- 30 µs --

Signed and Sealed this

Sixteenth Day of July, 2002

Attest:

JAMES E. ROGAN
Attesting Officer    Director of the United States Patent and Trademark Office